Feb. 26, 1957 E. F. MacNICHOL, JR 2,783,465
ELECTRICAL SIGNAL STORAGE SYSTEM
Filed April 18, 1946
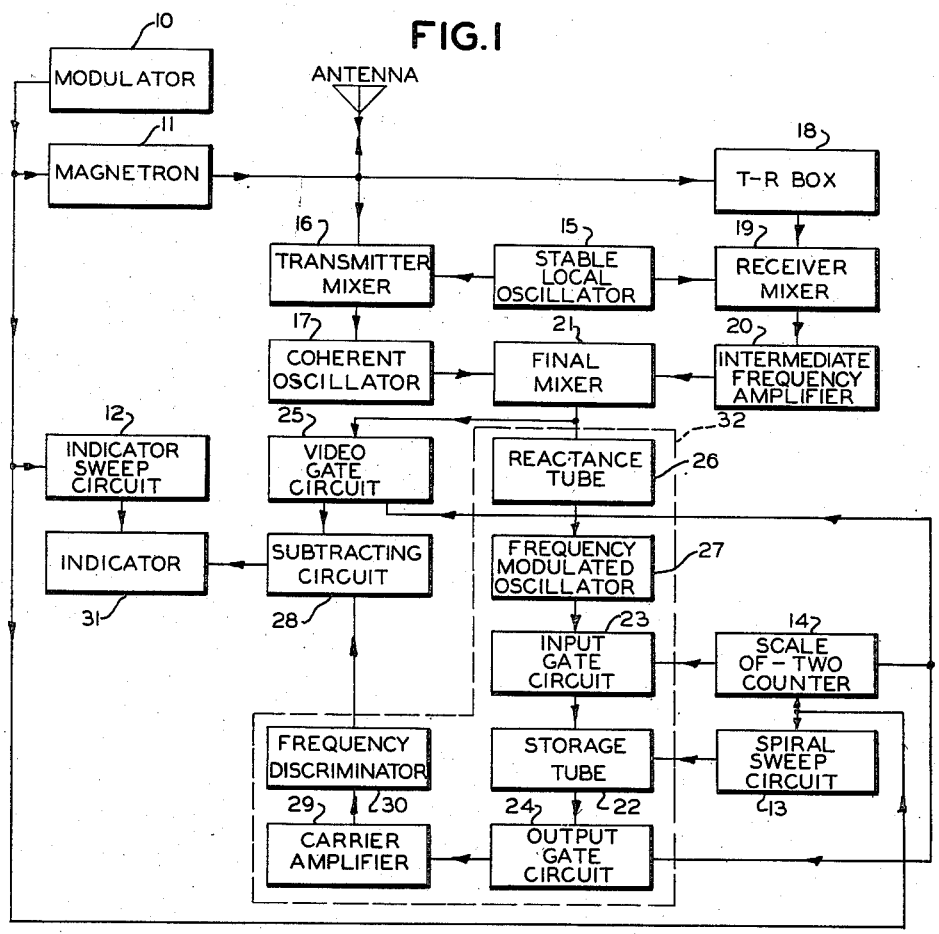
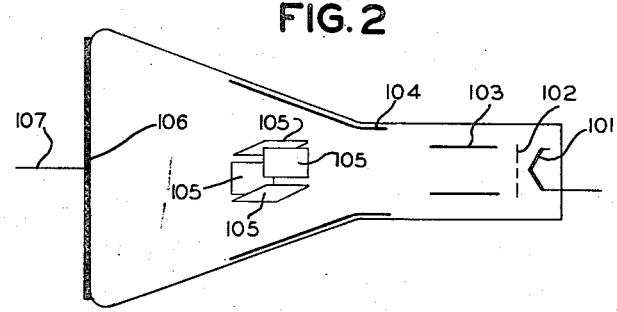
INVENTOR.
EDWARD F. MACNICHOL JR.
BY
ATTORNEY

2,783,465

ELECTRICAL SIGNAL STORAGE SYSTEM

Edward F. MacNichol, Jr., Hamilton, Mass., assignor, by mesne assignments, to the United States of America as represented by the Secretary of the Navy Application April 18, 1946, Serial No. 662,987

10 Claims. (Cl. 343—7.7)

This invention relates to radar apparatus for providing moving target indication, and more particularly to such apparatus employing a frequency modulated carrier for intensity modulating a storage tube.

In conventional radar systems the echoes which are received from fixed targets such as hills, trees, islands and buildings frequently prevent the perception of moving target echoes. Several systems have been devised which distinguish between moving targets and fixed targets by the character of the video pulses obtained from the echoes reflected by these targets. Most systems of this character are based upon the principle of maintaining stable reference oscillations synchronized with the transmitted, short duration, exploratory pulses, obtaining echo pulses from both fixed and moving targets, and combining the echo pulses with the reference oscillations to obtain video pulses for examination. The amplitude of the video pulses obtained in this manner is a function of the relative phase between the echo pulses and the reference oscillations. Fixed targets reflect successive echo pulses having a constant phase relationship to the reference oscillations. Moving targets, on the other hand, reflect successive echo pulses having a progressive phase shift with respect to the reference oscillations. These phenomena result in video pulses having constant amplitude for fixed targets, but video pulses having cyclically varying amplitudes for moving targets. By presenting the video pulses from both fixed and moving targets on a cathode ray oscilloscope to indicate signal strength versus range, the character of the video pulses serves to distinguish between fixed and moving targets. However, with the conventional plan-position-indicator indicating only range and bearing there is nothing in the character of the video pulses that can be used to distinguish between them. A delay line has been used to delay the video pulse pattern for one radar pulse interval. Then by subtracting the delayed video pulse pattern from an undelayed video pulse pattern the video pulses representing fixed targets cancel out while those representing moving targets give a difference video pulse. A delay line for this purpose is necessarily cumbersome and intricate and difficult to adjust. A storage tube has also been used as a delay device. The video pulse pattern has been stored directly by both deflection modulation and intensity modulation of the electron beam. However, the storage tube used in this manner gives an unsatisfactory output for comparison purposes because this output is not a linear function of the input to the grid.

Therefore, it is an object of this invention to provide apparatus which will produce moving target indication on any standard radar indicator.

Another object of this invention is to provide apparatus which will produce only moving target indications and eliminate fixed target indications.

It is a further object of this invention to provide such apparatus including a simple storage tube delay system.

It is still another object of this invention to provide such apparatus in which the storage tube is intensity modulated by a frequency modulated carrier.

These and other objects will become apparent upon consideration of the following description in conjunction with the accompanying drawing in which:

Fig. 1 is a block diagram of a radar system incorporating one embodiment of this invention, and Fig. 2 is a schematic diagram of one embodiment of a storage tube which may be used in the radar system shown in Fig. 1.

Fig. 1 discloses the coherent oscillator type of radar system which is normally used in moving target indication systems. Modulator 10 determines the pulse repetition frequency and the pulse length of the output of magnetron 11. In addition, each time magnetron 11 is caused to transmit a short duration pulse of radio frequency energy, modulator 10 supplies a trigger voltage to indicator sweep circuit 12, spiral sweep circuit 13, and scale-of-two counter 14. During each transmitted pulse the output of stable local oscillator 15 mixes with the radio frequency energy in the transmitted pulse in transmitter mixer 16 to give an intermediate frequency pulse for synchronizing coherent oscillator 17. Transmit-receive box 18 effectively disconnects receiver mixer 19 during each transmitted pulse to protect it from the damage which would result if the full power of magnetron 11 were directly applied to it. During the interval between transmitted pulses, hereafter to be called the pulse interval, transmit-receive box 18 reconnects receiver mixer 19 and echo pulses from targets are received. The radio frequency energy in the echo pulses is mixed with the output of stable local oscillator 15 in receiver mixer 19 to give intermediate frequency pulses which are then amplified by intermediate frequency amplifier 20. The intermediate frequency oscillations of coherent oscillator 17 which were synchronized during the transmitted pulse but maintained throughout the entire pulse interval are mixed with the intermediate frequency pulses from intermediate frequency amplifier 20 in final mixer 21. The intermediate frequency pulses representing fixed targets will bear a constant phase relationship to the coherent oscillator 17 oscillations while those representing moving targets will have a progressive phase shift. Therefore, the video output from final mixer 21 will consist of video pulses of constant amplitude for fixed targets, and video pulses of cyclically varying amplitude for moving targets. As was pointed out above, the video output from final mixer 21 could be viewed directly on an indicator which showed range versus signal strength and it would be possible to distinguish between fixed and moving targets although the fixed target indication would clutter up the screen and make the perception of moving target indications difficult. Furthermore, on a plan-position-indicator showing only range and bearing no differentiation could be made between fixed and moving targets.

This invention in broad terms makes possible the elimination of fixed target indication and the presentation of only moving target indication on any type of radar indicator by delaying the video pulse pattern from alternate pulse intervals by a time equal to one pulse interval and then subtracting it from the video pulse pattern from the following pulse interval. In this way video pulses from fixed target which have constant amplitude will cancel but video pulses from moving targets which have a cyclic variation in amplitude will give difference video pulses representing the moving targets. In the embodiment shown in Fig. 1 the delayed video pulse patterns are those traversing the path enclosed by dotted line 32 while the undelayed video pulse patterns are those passing through video gate circuit 25.

Fig. 2 discloses schematic diagram of one embodiment of a storage tube 22 as shown on Fig. 1. The storage tube is of the iconoscope type and comprises an electron gun including cathode 101, grid 102, first anode 103, second anode 104, electrostatic deflection plates 105 for deflecting the electron beam from the electron gun, and a storage surface 106 upon which the electron beam impinges. The storage surface consists of a clean glass surface the outside of which has a metallic coating called the signal plate. Each surface element of the clean glass surface is capable of emitting secondary electrons when bombarded by the electron beam. Effectively, therefore, the storage surface is a myriad of small condensers one side of each being a surface element and the other side being the signal plate. A connection from the signal plate is brought out to an output terminal 107. Under certain conditions an output signal may be developed across a load impedance connected to output terminal 107. In brief, the action of the storage surface is as follows: an electron beam impinging upon an emissive surface element causes the emission of secondary electrons. The nature of the clean glass surface is such that each surface element emits more secondary electrons than there are primary electrons impinging upon it and the result is that the element becomes positively charged. A corresponding negative charge is built up on the signal plate in the usual manner of a condenser. As the surface element becomes increasingly positive with the emission of secondary electrons, fewer of these electrons are emitted because the positive potential draws them back. A state of equilibrium is reached when the number of secondary electrons being emitted from the surface element is equal to the number of primary electrons impinging upon it. Thus a charge is built up on each condenser comprising a surface element and the signal plate which is proportional to the intensity of the electron beam impinging upon it.

Referring again to Fig. 1 spiral sweep circuit 12 has its sweep initiated by a trigger voltage from modulator 10 at the time the transmitted pulse is sent out. A scale-of-two counter 14 is actuated by the same trigger voltage from modulator 10 and supplies one cycle of output to the input gate circuit 23 and a second cycle of output inverted with respect to the first to the output gate circuit 24 and the video gate circuit 25 for each two trigger voltages from modulator 10. Described in terms of its function, scale-of-two counter 14 is a frequency divider having a division factor of two which may take the form of an Eccles-Jordan trigger circuit or a synchronized multivibrator. Reactance tube 26 modulates frequency modulated oscillator 27 in accordance with the video pulses from final mixer 21. The output of frequency modulated oscillator 27 is used to intensity modulate the electron beam of storage tube 22 under the control of the enabling voltage to input gate circuit 23. Input gate circuit 23 permits the intensity modulation of storage tube 22 during alternate pulse intervals when output gate circuit 24 and video gate circuit 25 prohibit the passage of an output from storage tube 22 and the passage of video pulses from final mixer 21 to the subtracting circuit 28, respectively, and vice versa. Carrier amplifier 29 amplifies an output from storage tube 22 under the control of output gate circuit 24. Frequency discriminator 30 detects the frequency modulation on carrier amplifier 29 output and injects the resulting video pulses into subtracting circuit 28. Subtracting circuit 28, therefore, receives two simultaneous inputs for subtracting during alternate pulse intervals. One represents the video pulse pattern from final mixer 21 for the present pulse interval while the other represents the video pulse pattern for the previous pulse interval since it has been delayed one pulse interval in coming through path 32 including storage tube 22. Subtracting circuit 28 is a signal mixing circuit which may include one amplifier tube with grid mixing or two amplifier tubes with a common anode impedance for anode mixing. Subtracting circuit 28 will differ from the conventional audio signal mixer in that the circuit constants are chosen for pulse operation. The polarity of the pulses applied to circuit 28 is selected so that the output signal will be proportional to the difference in amplitude of the two input pulses.

During every pulse interval spiral sweep circuit 13 causes the electron beam of storage tube 22 to sweep through the same spiral pattern. The video pulses from final mixer 21 change the reactance of reactance tube 26 which, in turn, changes the frequency of frequency modulated oscillator 27 in accordance with the video pulse pattern. On alternate pulse intervals input gate circuit 23 is enabled and the output of frequency modulated oscillator 27 is applied to the grid 102 of the electron gun in storage tube 22 to intensity modulate the electron beam as it sweeps through its spiral path. The condensers comprising the surface elements and the signal plate of the storage surface 106 are charged by an amount depending upon the intensity of the electron beam at the instant it sweeps over the surface elements on its spiral path. The output of frequency modulated oscillator 27 is one of sinusoidal variation of constant amplitude but of a frequency which varies in accordance with the video pulse pattern from final mixer 21. Thus the condensers are charged by amounts that vary sinusoidally along the spiral path, the maximum and minimum being constant but the distances between them varying. Effectively, then, a record of the video pulse pattern during one pulse interval is preserved on the storage surface 106. In between these alternate pulse intervals when the electron beam is intensity modulated the same spiral path is traced through with an electron beam of constant intensity. The condensers with charges related to the video pulse pattern from the previous pulse interval undergo a redistribution of their charges as the unmodulated electron beam sweeps over them. The result is an equalization of the charges on all condensers in preparation for the next pulse interval during which the electron beam will again be intensity modulated. The redistribution of the charges results in an output across a load impedance connected to output terminal 107 of storage tube 22. This output is amplified by carrier amplifier 29. The output from carrier amplifier 29 is substantially equal to that from frequency modulated oscillator 27 during the previous radar pulse interval and frequency discriminator 30 detects the video pulse pattern in the output of carrier amplifier 29. These video pulses are introduced into subtracting circuit 28. Simultaneously the video pulses for the present pulse interval are introduced into subtracting circuit 28 through video gate circuit 25. Subtracting circuit 28 subtracts the two video pulse patterns and its output representing the difference video signal is applied to indicator 31. If there were no moving targets the video pulse pattern would be the same for all pulse intervals and no output would be forthcoming from subtracting circuit 28. If there are both fixed and moving targets, however, the video pulses for the fixed targets will cancel out in the subtracting circuit so that an output will be obtained for the moving targets only. This output viewed on any conventional radar indicator 31 will show only moving targets and no fixed target indication will be present to interfere.

This invention is to be limited only by the appended claims and not by the foregoing description which refers to only one embodiment of the invention.

What is claimed is:

1. A radio pulse echo moving target indicator system comprising, a transmitter of pulses of radio frequency energy, a reference oscillator having a fixed phased relation to the phase of said transmitted pulses, receiver means mixing target echo pulses and said reference oscillations to produce video pulses having substantially constant amplitude and moving targets are evidenced by video pulses which vary in amplitude from one pulse interval to the next, a storage device including at least one electron gun and a storage surface, a sweep circuit to cause the electron beam of said storage device to scan over said storage surface, a frequency modulated oscillator the frequency thereof being modulated in accordance with the video pulse pattern from said radar system, means coupling said frequency modulated oscillator to said electron gun so as to modulate the intensity of said electron beam at the frequency of the output of said frequency modulated oscillator, said storage surface being adapted to record said variation in intensity of said electron beam, means to obtain an output from said storage device, a frequency discriminator to detect said video pulse pattern in the output of said storage device, and a subtracting circuit to obtain the difference between the video pulse patterns for two successive pulse intervals, said difference representing only moving targets.

2. A radio pulse echo moving target indicator system comprising, a transmitter of pulses of radio frequency energy, a reference oscillator having a fixed phase relation to the phase of said transmitted pulses, receiver means mixing target echo pulses and said reference oscillations to produce video pulses of constant amplitude for fixed targets and video pulses of cyclically varying amplitude for moving targets, a storage tube including an electron gun and a storage surface having a signal plate, a sweep circuit to cause scanning of the electron beam from said electron gun over said storage surface during each pulse interval of said radar system, a frequency modulated oscillator the frequency thereof being modulated in accordance with the video pulse pattern from said radar system, means coupling said frequency modulated oscillator to said electron gun during alternate pulse intervals so as to modulate the intensity of said electron beam at the frequency of the output of said frequency modulated oscillator, said storage surface being adapted to record said variation in intensity of said electron beam during said alternate pulse intervals, a carrier amplifier to amplify the output of said storage tube on alternate pulse intervals when said electron beam is unmodulated, said output being developed across a load impedance connected to said signal plate, a frequency discriminator to detect said video pulse pattern in the output of said carrier amplifier, and a subtracting circuit to subtract the video pulses from said radar system to give difference video pulses representing only moving targets.

3. A radio pulse echo moving target indicating system comprising, a transmitter of short duration exploratory pulses of radio frequency energy, a means for obtaining reference oscillations fixed in phase relative to said short duration exploratory pulses including a stable local oscillator and a reference oscillator synchronized by the beat frequency difference between said short duration exploratory pulse and said stable local oscillator output, a receiver for receiving echo pulses from said fixed and moving targets, said receiver including a mixer for combining the beat frequency difference between said echo pulse and stable local oscillator output with said reference oscillations to obtain video pulses of constant amplitude for said fixed targets and video pulses of cyclically varying amplitude for said moving targets, a storage tube including an electron gun and storage surface having a signal plate, a sweep circuit to cause the electron beam from said electron gun to sweep over the same pattern on said storage surface during each pulse interval of said transmitter, a frequency modulated oscillator the frequency thereof being modulated in accordance with the video pulse pattern from said receiver, said frequency modulated oscillator intensity modulating said electron beam on alternate pulse intervals to record said video pulse pattern on said storage surface for comparison during the following pulse interval, a carrier amplifier for amplifying the output of said storage tube on alternate pulse intervals when said electron beam is unmodulated, said output being developed across a load impedance connected to said signal plate, a frequency discriminator for detecting said video pulse pattern in the output of said carrier amplifier, and a subtracting circuit for subtracting the video pulses from said frequency discriminator from the video pulses obtained directly from said receiver to give difference video pulses representing only moving targets.

4. In a coherent pulse radar system of the character described wherein fixed targets are evidenced by video pulses having substantially constant amplitudes and moving target are evidenced by video pulses having cyclically varying amplitudes, a fixed target cancellation device comprising a storage tube including an electron gun and a storage surface having a signal plate, a spiral sweep circuit to cause the electron beam from said electron gun to sweep over said storage surface, said spiral sweep circuit being synchronized with the transmitted pulses of said radar system, a scale-of-two counter providing one cycle of output for each two transmitted pulses of said radar system, an input gate circuit operated by said scale-of-two counter for permitting intensity modulation of said electron beam during alternate pulse interval of said radar system, an output gate circuit operated by said scale-of-two counter for permitting an output to be taken across a load impedance connected to said signal plate of said storage surface during alternate pulse intervals when said electron beam is not intensity modulated, a frequency modulated oscillator for intensity modulating said electron beam, a reactance tube for frequency modulating the output of said frequency modulated oscillator in accordance with the video pulse pattern from said radar system, a carrier amplifier for amplifying the output of said storage tube, said output being develope across a load impedance connected to said signal plate, a frequency discriminator for detecting the frequency modulation of the carrier from said carrier amplifier, a video gate operated by said scale-of-two counter for permitting the passage of said video pulse pattern on said alternate pulse intervals when said output is being taken from said storage tube, a subtracting circuit for subtracting the video pulse pattern in the output of said frequency discriminator from the video pulses representing only moving targets, and an indicator to provide visual indication of said video pulses representing only said moving targets.

5. Apparatus for separating periodically recurring pulses of fixed amplitude from periodically recurring pulses of variable amplitude occurring in an input electrical signal, said fixed amplitude pulses having substantially the same recurrence rate as said variable amplitude pulses and being displaced in time therefrom, said apparatus comprising a controllable frequency oscillator, the instantaneous frequency of said oscillator being dependent upon the instantaneous amplitude of a signal applied thereto, means for applying said input signal to the input of said oscillator to control the frequency thereof, a frequency discriminator, a cathode ray tube signal delay means coupling a signal from said oscillator to said frequency discriminator, means for deflecting said cathode ray at the recurrence rate of said pulses, said delay means thereby effectively delaying the signal from said oscillator by a time interval equal to the interval between adjacent fixed pulses in said input signal, a signal combining circuit adapted to provide an output signal proportional to the difference in the amplitude of the first and second signals applied thereto, and means coupling said input electrical signal and the output of said frequency discriminator to said signal combining circuit whereby the output from said signal combining circuit comprises a signal representing only said pulses having a variable amplitude.

6. Apparatus as in claim 5 wherein said cathode ray tube signal delay means comprises a screen in the form of a clean glass surface, an electron gun adapted to project an electron beam at said screen, deflection means adapted to deflect said beam along a retraceable path on said screen, a conductive surface disposed on said screen on the side thereof opposite the side on which said electron beam impinges, said oscillator being coupled to said electron gun to vary the intensity of said electron beam in accordance with the amplitude of the output of said oscillator the output signal of said delay means coupled to said frequency discriminator being obtained from said conductive surface.

7. Apparatus for delaying variable amplitude electrical pulse signals, said apparatus comprising a controllable frequency oscillator, the instantaneous frequency of said oscillator being dependent upon the instantaneous amplitude of a signal applied thereto, signal storage means coupled to the output of said controllable frequency oscillator, said signal storage means being adapted to retain for a predetermined time information corresponding to the output signal of said controllable frequency oscillator, means for extracting a signal from said signal storage means, said extracted signal corresponding in frequency to said signal in the output of said oscillator, and a frequency discriminator coupled to said signal extracting means, the output of said frequency discriminator corresponding in amplitude to said input signal delayed in time by an interval equal to the interval between the time said signal was applied to said signal storage means and the time said signal was extracted from said signal storage means.

8. Apparatus for delaying variable amplitude electrical pulse signals, said apparatus comprising a controllable frequency oscillator, the instantaneous frequency of said oscillator being dependent upon the instantaneous ampltiude of a signal applied thereto, a storage tube including an electron gun and a storage surface having a signal plate, a sweep circuit adapted to cause scanning of the electron beam from said electron gun over said storage surface during a first time interval, means coupling said frequency modulated oscillator to said electron gun so as to modulate the intensity of said electron beam at the frequency of the output of said oscillator during said first time interval, said sweep circuit being adapted to cause said electron beam from said electron gun to retrace during said second time interval the path followed by said modulated electron beam during said first time interval, a frequency discriminator coupled to said signal extracting means, and means for coupling said input signals to the input of said controllable frequency oscillator, the output from said frequency discriminator being a signal corresponding in amplitude to the input signal delayed by a preselected time.

9. Apparatus for delaying electrical pulse signals, said apparatus comprising, a storage tube including an electron gun, said electron gun including means for controlling the intensity of the electron beam from said electron gun, and a storage surface including a signal plate, a sweep circuit coupled to said storage tube and adapted to cause said electron beam to periodically sweep a preselected path on said storage surface, a controllable frequency oscillator, the instantaneous frequency of said oscillator being dependent upon the instantaneous amplitude of a signal applied thereto, means coupling the output of said oscillator to said beam intensity control means during alternate sweeps of said electron beam over said storage surface, a signal amplifier means, means coupling said signal amplifier means to said signal plate during sweeps of said electron beam immediately following the sweeps during which said oscillator is coupled to said intensity control, a frequency discriminator coupled to the output of said amplifier and means coupling the signal to be delayed to the input of said oscillator.

10. Apparatus for delaying electrical pulse signals, said apparatus comprising, a storage tube including an electron gun, said electron gun including means for controlling the intensity of the electron beam from said electron gun, and a storage surface including signal plate, a controllable frequency oscillator, the instantaneous frequency of said oscillator being dependent upon the instantaneous amplitude of the signal applied thereto, means generating a cyclic control signal, a sweep circuit coupled to said storage tube and adapted to cause said electron beam to sweep a preselected path on said storage surface during each half cycle of said control signal, means responsive to said control signal for coupling the output of said oscillator to said beam intensity control means during first half cycles of said control signal, a signal amplifier, means responsive to said control signal for coupling said signal plate to said amplifier during second half cycles of said control signal, a frequency discriminator responsive to the output of said amplifier and means coupling said signal to be delayed to said oscillator to control the frequency thereof, whereby pulse signals occurring during first half cycles of said control signals are delayed for a time interval equal to the time duration of one half cycle of said control signal.

References Cited in the file of this patent

UNITED STATES PATENTS

| | | | |
|---|---|---|---|
| 2,406,316 | Blumlein | | Aug. 27, 1946 |
| 2,407,000 | Evans | | Sept. 3, 1946 |
| 2,422,135 | Sanders | | June 10, 1947 |
| 2,437,173 | Rutherford | | Mar. 2, 1948 |
| 2,454,410 | Snyder | | Nov. 23, 1948 |